Sept. 8, 1942.　　　W. A. RIDDELL　　　2,295,010
PHOTOGRAPHIC SHUTTER
Filed Oct. 31, 1940
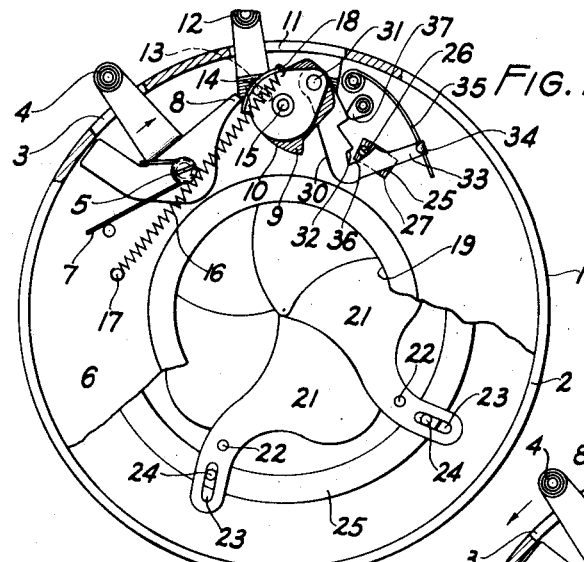
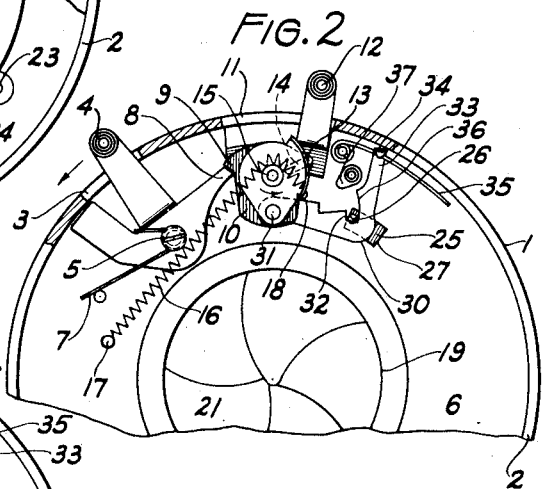
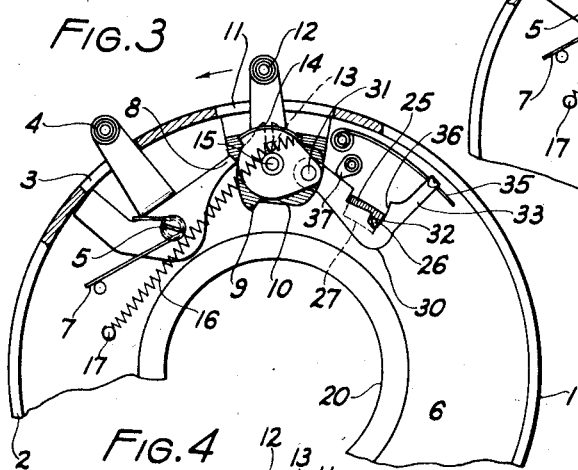
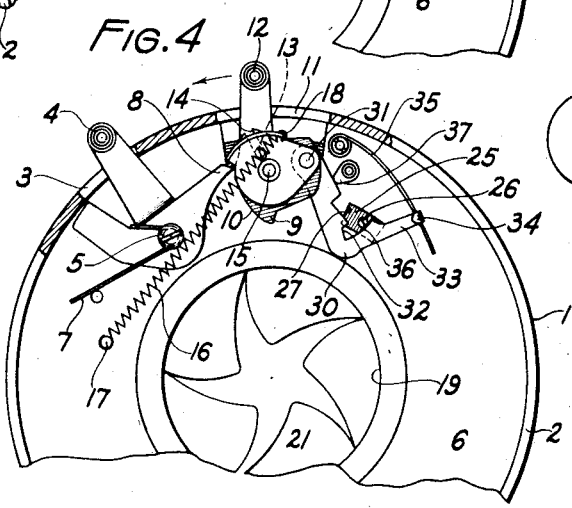
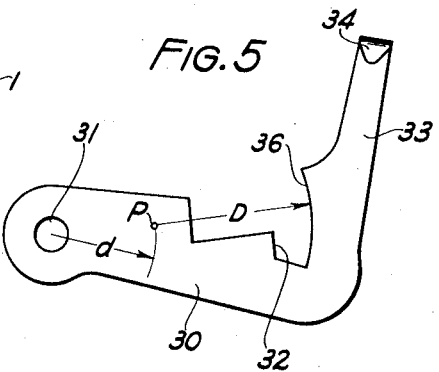
WILLIAM A. RIDDELL
INVENTOR
BY
ATTORNEYS Patented Sept. 8, 1942

2,295,010

UNITED STATES PATENT OFFICE 2,295,010

PHOTOGRAPHIC SHUTTER

William A. Riddell, Rochester, N. Y., assignor to Eastman Kodak Company, Rochester, N. Y., a corporation of New Jersey Application October 31, 1940, Serial No. 363,616

7 Claims. (Cl. 95—63)

This invention relates to photography, and more particularly to photographic shutters.

One object of my invention is to provide a shutter in which the time for opening and closing shutter blades is reduced to a minimum. Another object of my invention is to provide a setting type of shutter with a connection between the master member and the shutter leaves which will accelerate the closing movement of the shutter blades. Another object of my invention is to provide a setting shutter of the latch type with a means for latching the master member to the shutter blades for movement in one direction and with a means for releasing this latch before the exposure is complete when the leaves are moving in an opposite direction, so that the master member can be set without operating the shutter blades. Still another object of my invention is to provide a shutter with a mechanism of the class described which is simple and which can be readily assembled with relatively unskilled help. Other objects will appear from the following specification, the novel features being particularly pointed out in the claims at the end thereof.

Coming now to the drawing, wherein like reference characters denote like parts throughout:

Fig. 1 is a front elevation of a shutter, parts being broken away and the cover being removed showing a shutter mechanism constructed in accordance with and embodying a preferred form of my invention.

Fig. 2 is a fragmentary view similar to Fig. 1, but with the shutter in a set position, showing the parts ready to make an exposure.

Fig. 3 is a view similar to Fig. 2 with the shutter parts shown in the position they assume when the shutter blades have been opened in making an exposure.

Fig. 4 is a view similar to Fig. 3, but with the shutter parts in the position they assume as the shutter leaves approach a closed position.

Fig. 5 is an enlarged plan view of the shutter lever on an enlarged scale.

In shutters of the so-called latch type, it has been customary to provide a mechanism which may rapidly open and close the shutter blades. In such shutters the time for closing the shutter blades has usually been somewhat longer than the time for opening the blades, because of the fact that the spring is under a greater tension during the opening movement than during the closing movement. In typical shutters of this type, the opening time for the shutter blades may be (.001) one-thousandth of a second or (.0015) one and one-half thousandths of a second, and the closing time may be from (.0015) one and one-half thousandths of a second to (.002) two one-thousandths of a second. Such shutters have always been considered quite efficient, particularly at speeds of from $\frac{1}{100}$ of a second to the slowest speed, which is usually one second.

The latch type of shutters are broadly quite old, and my present invention is for an improvement over shutters of the type shown in my Patents 2,099,866, "Photographic shutter," November 23, 1937, and 2,172,295, "Setting shutter leaf rebound latch," September 5, 1939. In accordance with my present invention, the latch is so moved that the closing movement of the shutter leaves is accelerated to equal or sometimes exceed the speed of the opening movement of the shutter blades.

As a typical example of a shutter constructed in accordance with my invention, reference may be had to the drawing. As indicated in the drawing, the shutter may consist of the usual casing 1, having an upstanding flange 2 extending around the casing and having a notch 3, through which a trigger member 4 may project. The trigger member 4 may be pivoted upon a stud 5 passing into the mechanism plate 6 and a spring 7 may be employed to normally turn the trigger 4 in the direction shown by the arrow, so as to position the latch element 8 in contact with a second latch element 9 on the master member 10 to hold the master member in the set position shown in Fig. 2.

The flange 2 may likewise have a slot 11, through which a setting lever 12 may pass, this setting lever being of the type shown in my first mentioned patent and including a pin 13 for engaging a slot 14 in the master member 10 which is mounted to oscillate upon a stud 15. A spring 16, attached at 17 to the shutter plate 6, and attached at 18 to the master member, furnishes the power which normally tends to turn the master member 10 in a counter-clockwise direction.

The shutter plate 6 has a central opening 19 and there is also a central opening 20 in the back of the shutter casing which is not here shown. These two openings are closed by shutter leaves 21, which, as shown in Fig. 1, may be pivotally attached at 22 to the shutter casing and may have a slot 23 engaging pins 24 on a blade ring 25 mounted to oscillate in the shutter casing and carrying an upstanding protuberance 26 which projects through a slot 27 in the shutter plate 6.

In order to operate the shutter leaves 21, the ring 25 is oscillated by means of the protuberance 26 in the following manner: A lever 30 is pivotally attached to a stud 31, which is mounted on the master member 10 eccentrically of the master member pivot 15. Thus, when the master member is moved from the position shown in Fig. 2 to the position shown in Fig. 1, the stud 31 rocks through an arc of somewhat less than 180°. The lever 30 is provided with a latching notch 32 which may engage the blade ring protuberance 26, as shown in Fig. 2, and the lever is also provided with a transversely extending arm 33, having a turned-over end 34 engaging a spring 35 which always tends to turn the lever 30 toward the upstanding flange 2 of the shutter casing. The arm 33 is also provided with a curved cam surface 36 which may also engage the upstanding protuberance 26 of the blade ring 25.

On the shutter plate 6, there is an abutment 37 which is so positioned that it may engage the lever 30 intermediate its ends during a portion of its movement in making an exposure. The reason for this is as follows.

With the shutter parts in the position shown in Fig. 2, the master member 10 has been set by the lever 12 and the spring 16 is under tension. To make an exposure, the trigger 4 is pressed in the direction shown by the arrow (Fig. 2), thus releasing the latch members 8 and 9 and permitting the spring 16 to turn the master member in a counterclockwise direction, thus rapidly moving the pivot 31 through an arcuate path. As the exposure starts, the leaves open until the parts reach the position shown in Fig. 3, in which the leaves are totally open. The pivot 31 has swung through a portion of its arcuate path, and the blade ring protuberance 26 has been carried from the position shown in Fig. 2 through approximately the length of the slot 27. During this movement, the upstanding protuberance 26 was latched to the lever 30 through the notch 32. As the parts reach the position in which the direction of the blade ring 25 must be reversed for closing the leaves, an intermediate part of the lever strikes the abutment 37, so that as the pivot 31 continues through its arcuate movement, as indicated in Fig. 4, the lever 30 will not only be drawn toward the master member, but it will be moved about the abutment as a fulcrum, causing the cam surface 36 to wipe across the blade ring protuberance 32, thus accelerating the movement of the blade ring and speeding up the closing movement of the blades.

Referring to Fig. 5, it will be noted that the cam surface 36 of the lever 30 is formed by making this cam curve about a point P a distance D from the cam, the point P being spaced a distance d from the pivot 31 of the lever. Thus, the cam surface is so shaped that when the lever is wiped across the upstanding protuberance 26, the movement of the blade ring is much faster than it would be if the surface of the cam 36 were an arc drawn about the pivot 31, or much faster than would be the case if the arm 33 of the lever merely extended at substantially right angles to the lever, as shown in my Patent 2,099,866 above referred to.

There is an additional advantage in having the latching notch 32 and the cam surface 36 arranged as shown in the drawing, because it makes it a simple structure to assemble and it provides a structure which does not require exceedingly accurate or fine adjustment of the parts to definitely release the latching lever 30 at the end of its stroke.

As will be noted from Fig. 4, the parts are now approaching the totally closed position shown in Fig. 1. The abutment 37 has cammed the lever 30 so that the blade ring protuberance 26 lies adjacent the end of the cam. It will be noted that in this position, the latching notch 32 is spaced quite a distance from the blade ring protuberance and consequently, when the shutter is fully closed and the master member has run down, as shown in Fig. 1, there is no danger of having the latching member catch the blade ring protuberance 26 when the shutter is again set. In setting the shutter with the parts in the position of Fig. 1, movement of the lever 12 causes a clockwise movement of the master member 10. It is, therefore, impossible for the latch 32 to engage the upstanding blade ring protuberance during the setting movement so that the lever 30 is rocked idly back and forth until it reaches the position shown in Fig. 2, in which the lever 30 will be so positioned by the spring 35 that the blade ring protuberance 26 will lie in the notch-like latch 32. From this position the operation of the shutter is as above described.

The curve of the cam 36, together with the position of the abutment 37 and, of course, the speed of the master member 10, controls the speed of the shutter blade closing movement. If a steeper cam surface 36 is provided, it is more difficult for the master member to operate the lever 30 so that this cam shape has to be so selected that it can be quickly operated by the master member without utilizing too much power. However, it has been found with the parts shaped approximately as shown in the drawing that an extremely rapid action can be obtained and that the master member 31 has no difficulty in swinging the lever 30 after it strikes the abutment 37, thereby causing the lever 30 to move transversely with respect to the shutter blade ring protuberance 26 during the closing movement.

In a shutter of the type shown in the drawing, the movement of the lever 30 is slower during that part of the movement which causes the pivot 31 to cross a line between the pivot 15 and the upstanding protuberance 26. In other words, as the pivot 31 passes through the dead center, the lever 30 moves very slowly relative to the upstanding protuberance 26. This movement is somewhat faster during the beginning and end of the movement of the stud 31 as these parts have a toggle action. One of the advantages of my improved construction which includes the cam 36 for accelerating the movement of the upstanding protuberance 36 when the lever 30 is drawn across this protuberance due to the projection 37 and the movement of the stud 31 is that the shutter blades, of course, close much quicker. The cam also accelerates the movement of the lever 30 just as it passes the dead center and this speeds up the operation of the fast exposures made with the shutter.

I have found that a shutter without the improved cam 36 construction or constructed in accordance with my Patent 2,099,866 which could give an exposure of $\frac{1}{200}$ second could be speeded up to give an exposure of $\frac{1}{333}$ second by merely changing to the lever 30 with the cam 36 and with the projection 37 adapted to strike the lever 30. This increase in speed is due not only to the fact that the shutter blades close much faster but it is also due to the fact that the lever 30 is moved past its dead center somewhat faster.

My improved construction therefore provides a means for producing higher speed exposures with shutters by means of a comparatively simple alteration in the construction of the shutter and my means of a change in the shutter blade ring driving mechanism which does not rely on any increased spring pressure to accomplish the desired results. The shutter is made more efficient by reducing the time that would otherwise be necessary for the shutter blades to close. Repeated tests have indicated that with a small size shutter the blades can be made to close in approximately $\frac{1}{1000}$ of a second thus actually exceeding the time required to open the shutter blades.

What I claim is:

1. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades, and means for setting and releasing the master member, the combination with said master member and said blade ring, of a lever pivotally attached to the master member and adapted to engage and move the blade ring protuberance to make an exposure, said lever including a latch element and a curved arm forming a cam concave toward the pivot of the lever and having portions of the cam spaced at different distances from the pivot, the arm and said blade ring being moved to open the blades by means of the latch element, and being moved to close the blades by the cam, as the master member is moved by its spring.

2. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades, means for setting and releasing the master member, the combination with said master member and said blade ring, of a lever pivotally attached to the master member and adapted to engage and move the blade ring protuberance to make an exposure, said lever including a latch element and a curved arm forming a cam concave toward the pivot of the lever and including different portions spaced at different distances from said pivot, the arm with its cam being adapted to be moved back and forth as the master member is turned upon its pivot by its spring, an abutment and a spring, the former lying in the path of the lever and the latter tending to turn the lever toward said abutment, whereby contact of the lever with the abutment may cause said cam to engage said blade ring protuberance and accelerate the closing movement of the shutter blades.

3. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades and means for setting and releasing the master member, the combination with said master member and said blade ring, of a lever pivotally attached to the master member and adapted to engage and move the blade ring protuberance to make an exposure, said lever including a latch element and a curved arm forming a cam concave toward the lever pivot and having areas differentially spaced therefrom, the lever's pivotal attachment to the master member being such that said lever rocks back and forth as the master member moves in one direction under the impulse of its spring about its pivot, the latch element on the lever consisting of a notch shaped to engage the blade ring protuberance when said lever is rocked in one direction and to disengage the blade ring protuberance when rocked in another direction, whereby said master member may be set without operating the shutter blades, said cam on the lever having a curved face to engage the blade ring protuberance while said lever moves transversely relative thereto, an abutment for guiding the lever through a path, and a spring tending to hold the lever toward the abutment whereby the cam may accelerate movement of the blade ring.

4. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades, and means for setting and releasing the master member characterized in that a lever is pivotally attached to the master member eccentrically of the pivoted master member to rock back and forth when the master member moves in one direction, said lever including a latching notch and a curved cam having its center of curvature between the pivot of the lever and the arm, said latching notch and curved cam both positioned to successively engage the blade ring protuberance when the master member moves in one direction, a spring tending to move the lever in one direction and means for accelerating movement of the lever cam relative to the blade ring protuberance to speed up the operation of the shutter blades moved thereby.

5. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades, and means for setting and releasing the master member characterized in that a lever is pivotally attached to the master member eccentrically of the pivoted master member to rock back and forth when the master member moves in one direction, said lever including a latching notch and a curved cam having a center of curvature toward the master member pivot and approximately midway between the master member pivot and the arm; both the cam and said latching notch positioned to engage the blade ring protuberance when the master member moves in one direction, a spring tending to move the lever in one direction and means for accelerating movement of the lever cam relative to the blade ring protuberance comprising an abutment located between the master member and blade ring protuberance and positioned to contact with said lever during at least a part of the movement of said lever while driven by said master member and engaging said blade ring protuberance.

6. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades, and means for setting and releasing the master member characterized in that a lever is pivotally attached to the master member eccentrically of the pivoted master member to rock back and forth when the master member moves in one direction, said lever including a latching notch and a curved cam, said cam being concave toward said lever pivot and so shaped that one end of said cam is materially closer to said pivot than the other end thereof, said latching notch and said cam both positioned to engage the blade ring protuberance when the master member moves in one direction, a spring tending to move the lever in one direction and means for accelerating movement of the lever cam relative to the blade ring protuberance comprising an abutment located between the master member and blade ring protuberance and positioned to contact with an intermediate portion of said lever during a part of its movement as its pivotal connection with the master member moves one end of the lever through an arc, said abutment releasing the latching notch of the lever from the blade ring notch before movement of the blade ring protuberance by the lever is completed, whereby movement to set the master member will move the lever without said lever engaging the blade ring protuberance.

7. A photographic shutter of the type including a casing, a pivotally mounted master member mounted in the casing, a spring for driving the master member, shutter blades movably mounted in the casing, a blade ring oscillatably mounted in the casing and carrying a protuberance for moving the shutter blades, and means for setting and releasing the master member characterized in that a lever is pivotally attached to the master member eccentrically of the pivoted master member to rock back and forth when the master member moves in one direction, said lever being substantially L-shaped and including a latching notch and a curved cam positioned to engage the blade ring protuberance one end of said cam being materially closer to the lever pivot than the other end thereof, the latching notch being of approximately the size of the blade ring protuberance to engage the protuberance and the cam extending outwardly therefrom and positioned to slidably engage the blade ring protuberance when the master member moves the L-shaped lever in one direction.

WILLIAM A. RIDDELL.